US009068589B2

(12) United States Patent
Sugiki (10) Patent No.: US 9,068,589 B2
(45) Date of Patent: Jun. 30, 2015

(54) ROTATING DEVICE

(71) Applicant: SAMSUNG ELECTRO-MECHANICS JAPAN ADVANCED TECHNOLOGY CO., LTD., Fujieda, Shizuoka Prefecture (JP)

(72) Inventor: Ryusuke Sugiki, Fujieda (JP)

(73) Assignee: SAMSUNG ELECTRO-MECHANICS JAPAN ADVANCED TECHNOLOGY CO., LTD., Fujieda, Shizuoka Prefecture (JP)

( * ) Notice: Subject to any disclaimer, the term of this patent is extended or adjusted under 35 U.S.C. 154(b) by 0 days.

(21) Appl. No.: 14/086,275

(22) Filed: Nov. 21, 2013

(65) Prior Publication Data

US 2014/0147065 A1 May 29, 2014

(30) Foreign Application Priority Data

Nov. 28, 2012 (JP) ................................. 2012-259435

(51) Int. Cl.
*F16C 32/06* (2006.01)
*F16C 17/02* (2006.01)
*F16C 33/10* (2006.01)

(52) U.S. Cl.
CPC ........... *F16C 17/026* (2013.01); *F16C 2370/12* (2013.01); *F16C 33/1045* (2013.01); *F16C 33/106* (2013.01); *F16C 33/107* (2013.01)

(58) Field of Classification Search
CPC ...... F16C 17/107; F16C 17/10; F16C 17/102; F16C 33/1015; F16C 33/1045; F16C 33/106; F16C 33/107; F16C 2370/12; H02K 5/167–5/1677; H02K 7/08; H02K 7/088; G11B 19/2036
USPC .................................................. 384/100–124
See application file for complete search history.

(56) References Cited

U.S. PATENT DOCUMENTS

| | | | |
|---|---|---|---|
| 5,533,811 A | 7/1996 | Polch et al. | |
| 7,201,516 B2 * | 4/2007 | Haga | 384/100 |
| 7,982,349 B2 | 7/2011 | Popov et al. | |
| 8,277,125 B2 | 10/2012 | Kimura et al. | |
| 2001/0001269 A1 * | 5/2001 | Asai | 384/100 |
| 2004/0264819 A1 * | 12/2004 | Weingord et al. | 384/107 |
| 2008/0130168 A1 * | 6/2008 | Higuchi et al. | 360/99.08 |
| 2008/0218019 A1 * | 9/2008 | Sumi | 310/90 |
| 2009/0140587 A1 * | 6/2009 | Popov et al. | 310/90 |
| 2009/0231754 A1 * | 9/2009 | Sekii et al. | 360/99.08 |
| 2010/0166344 A1 * | 7/2010 | Hori et al. | 384/107 |
| 2010/0195248 A1 * | 8/2010 | Yamada et al. | 360/129 |
| 2010/0244601 A1 * | 9/2010 | Shimizu et al. | 310/90 |

(Continued)

*Primary Examiner* — Alan B Waits
(74) *Attorney, Agent, or Firm* — Holtz, Holtz, Goodman & Chick PC (57) ABSTRACT

A rotating device includes a shaft body that has a shaft, a first flange extending outwardly from the outer periphery of the shaft, and a second flange, a bearing body that has a shaft encircling member encircling the shaft between the first flange and the second flange, a first thrust opposing part formed between the shaft encircling member and the first flange, a second thrust opposing part formed between the shaft encircling member and the second flange, an intermediate space provided in a gap between the shaft and the shaft encircling member, a radial dynamic pressure bearing, a first communication channel that allows the first thrust opposing part to be in communication with the intermediate space, and a second communication channel that allows the second thrust opposing part to be in communication with the intermediate space.

4 Claims, 7 Drawing Sheets

(56) References Cited

U.S. PATENT DOCUMENTS

| | | |
|---|---|---|
| 2010/0277833 A1 | 11/2010 | Sugiki |
| 2010/0310199 A1* | 12/2010 | Okamura et al. ............ 384/114 |
| 2012/0090163 A1 | 4/2012 | Kodama et al. |
| 2012/0183243 A1 | 7/2012 | Sugiki |
| 2013/0322793 A1* | 12/2013 | Kodama et al. ............ 384/112 |

* cited by examiner

ROTATING DEVICE

BACKGROUND OF THE INVENTION

1. Field of the Invention

The present invention relates to a rotating device including a shaft body and a bearing unit supported in a rotatable manner with respect to each other.

2. Description of the Related Art

Rotating devices like a disk drive device are becoming compact and increasing the capacity thereof, and are built in various electronic devices. Such rotating devices are popularly built in, in particular, a hard disk drive that is a kind of disk drive devices of portable electronic devices, such as a laptop computer and a portable music player. The rotating devices like the disk drive devices built in such portable electronic devices require improved shock resistance and vibration resistance (hereinafter, referred to as "vibration resistance characteristic, etc.,") so as to withstand against a shock due to falling and a vibration when carried in comparison with the rotating devices built in stationary electronic devices like a desktop computer. Moreover, such rotating devices require thinning and weight saving in comparison with the rotating devices built in the stationary electronic devices like a desktop computer. In general, thinning and improvement of the vibration resistance characteristic, etc., are in a trade-off relationship.

The inventor of the present invention has proposed in, for example, JP 2010-261580 A, a rotating device that is a disk drive device having a fluid dynamic bearing mechanism formed between a shaft body and a bearing unit, and having the shaft body including a shaft fixed to a base. According to the rotating device disclosed in JP 2010-261580 A, a radial dynamic bearing is formed in a space in the radial direction between the shaft body and the bearing unit, and a thrust dynamic bearing is formed therebetween in a space in the axial direction.

In the case of the rotating device that is a disk drive device disclosed in JP 2010-261580 A, in order to improve the vibration resistance characteristic, etc., it is necessary to improve the rigidity of the radial dynamic bearing (hereinafter, referred to as a "radial rigidity"). To improve the radial rigidity, there is a scheme of making a space narrower in the radial direction between the shaft body and the bearing unit both configuring a radial bearing. However, in the case of such a rotating device, if the space between the shaft body and the bearing unit is too small, the shaft body and the bearing unit contact with each other when the rotating device is rotating, disturbing the rotation thereof, and in the worst case, the shaft body and the bearing unit are highly possibly damaged.

Moreover, when the radial dynamic pressure is set to be high, the possibility of making the dynamic pressure generated at a radial dynamic bearing unbalanced becomes high. The unbalancing of the dynamic pressure may produce a negative pressure region in a lubricant. When a negative pressure region is produced in the lubricant, gases dissolved in the lubricant at that region are vaporized and bubbles are formed. Such bubbles decrease the dynamic pressure generating function when entering in the radial dynamic bearing. In the worst case, the lubricant is blasted out from a region where the lubricant is present, deteriorating the bearing function.

In view of such circumstances, the inventor of the present invention realized that in order to improve the vibration resistance characteristic, etc., of rotating devices, it is necessary to reduce the unbalancing of the dynamic pressure at radial dynamic bearing, thereby suppressing a generation of a negative pressure region.

Such a technical issue arises in the cases of not only the rotating device built in a portable electronic device but also other kinds of electronic devices.

The present invention has been made in view of such a circumstance, and it is an objective of the present invention to accomplish both thinning and improvement of the vibration resistance characteristic, etc., of a rotating device.

SUMMARY OF THE INVENTION

According to an aspect of the present invention, a rotating device is provided. This rotating device includes: a shaft body comprising a shaft, a first flange extending outwardly in a radial direction from an outer periphery surface of the shaft at a first end side, and a second flange extending outwardly in the radial direction from a second end of the shaft; a bearing unit comprising a shaft encircling member that encircles at least a part of the shaft, the bearing unit being rotatable relative to the shaft body; a first thrust opposing part formed in a gap between the shaft encircling member and the first flange in the axial direction; a second thrust opposing part formed in a gap between the shaft encircling member and the second flange in the axial direction; a radial dynamic pressure bearing part comprising a first radial dynamic pressure bearing and a second radial dynamic pressure bearing, the first radial dynamic pressure bearing being provided at a side near the first thrust opposing part in a gap between the shaft and the shaft encircling member, and the second radial dynamic pressure bearing being provided at a side near the second thrust opposing part in the gap between the shaft and the shaft encircling member with an intermediate space present between the first radial dynamic pressure bearing and the second radial dynamic pressure bearing; a lubricant present between the shaft body and the bearing unit; a first communication channel that allows the first thrust opposing part to be in communication with the intermediate space; and a second communication channel that allows the second thrust opposing part to be in communication with the intermediate space.

According to another aspect of the present invention, a rotating device is provided. This rotating device includes: a shaft body comprising a shaft, a first flange extending outwardly in a radial direction from an outer periphery surface of the shaft at a first end side, and a second flange extending outwardly in the radial direction from a second end of the shaft; a bearing unit comprising a shaft encircling member that encircles at least a part of the shaft; at least one radial dynamic pressure bearing part provided in a gap between the shaft and the shaft encircling member in the radial direction; an intermediate space provided in at least a part of the gap other than an area where the radial dynamic pressure bearing part is formed; a first thrust opposing part formed in a gap between the shaft encircling member and the first flange in the axial direction; a second thrust opposing part formed in a gap between the shaft encircling member and the second flange in the axial direction; a lubricant present between the shaft body and the bearing unit; and a first communication channel that allows the first thrust opposing part to be in communication with the intermediate space.

According to the other aspect of the present invention, a rotating device is provided. This rotating device includes: a shaft body comprising a shaft, a first flange extending outwardly in a radial direction from an outer periphery surface of the shaft at a first end side, and a second flange extending outwardly in the radial direction from a second end of the shaft; a bearing unit comprising a shaft encircling member that encircles at least a part of the shaft, the bearing unit being rotatable relative to the shaft body; a first thrust opposing part formed in a gap between the shaft encircling member and the first flange in the axial direction; an intermediate space provided in a gap between the shaft and the shaft encircling member in the radial direction; a radial dynamic pressure bearing part comprising a first radial dynamic pressure bearing provided at a first-thrust-opposing-part side of the intermediate space, the radial dynamic pressure bearing part generating dynamic pressure to a lubricant present between the shaft body and the bearing body; a first communication channel that allows the first thrust opposing part to be in communication with the intermediate space; a base provided with a base opening that retains at least a part of the shaft body and fixes the shaft body; and a top cover provided with a through-hole and also provided so as to cover the shaft body and the bearing unit. The shaft includes an upper rod including the first flange, and a lower rod including the second flange. The upper rod has a fastener retainer hole formed in an end of the upper rod at a first-flange side. A fastener passing all a way through the through-hole is inserted in and fixed to the fastener retainer hole to fix the upper rod to the top cover. At least a part of the lower rod is inserted in and fixed to the base opening to fix the lower rod to the base. The fastener retainer hole extends in the axial direction over a region where the first radial dynamic pressure bearing is formed.

Any combination of the above-identified structural elements and mutual replacement of such structural elements and expressions between a method, a device, and a system, etc., are also effective as an aspect of the present invention.

According to the present invention, there is provided a technology that facilitates thinning of a rotating device with a dynamic pressure bearing.

DETAILED DESCRIPTION OF THE PREFERRED EMBODIMENTS

An explanation will be given of a preferred embodiment of the present invention with reference to the accompanying drawings. The same or similar structural element or member will be denoted by the same reference numeral throughout the figures, and the duplicated explanation will be omitted accordingly. The dimension of each member in the figure is enlarged or reduced as needed to facilitate understanding for the present invention. A part of the member not important to explain an embodiment of the present invention in the figure will be also omitted.

A rotating device of an embodiment is suitably used as, for example, a disk drive device like a hard disk drive on which magnetic recording disks for magnetically recording data are to be mounted and which rotates and drives the magnetic recording disks. The rotating device is suitably used as, in particular, a fixed-shaft disk drive device which has a shaft fixed to a chassis, and which causes a hub to rotate relative to the shaft. The rotating device of this type includes, for example, a rotating body that is attached to a stationary body via bearing means in a freely rotatable manner. The rotating body includes, for example, mounting means for mounting a drive-target medium like a magnetic recording disk. The bearing means includes, for example, radial bearing means formed at one of the stationary body and the rotating body. The bearing means also includes, for example, thrust bearing means formed at one of the stationary body and the rotating body. The thrust bearing means is, for example, located outwardly with respect to the radial bearing means in the radial direction. For example, the radial bearing means and the thrust bearing means may generate dynamic pressure to a lubrication medium. The radial bearing means and the thrust bearing means may contain, for example, a lubrication fluid. The rotating device may include, for example, rotating-driving means for giving rotational torque to the rotating body. The rotating-driving means may be, for example, a brushless spindle motor. The rotating-driving means may also include, for example, a coil and a magnet.

Embodiment

Figure 1:
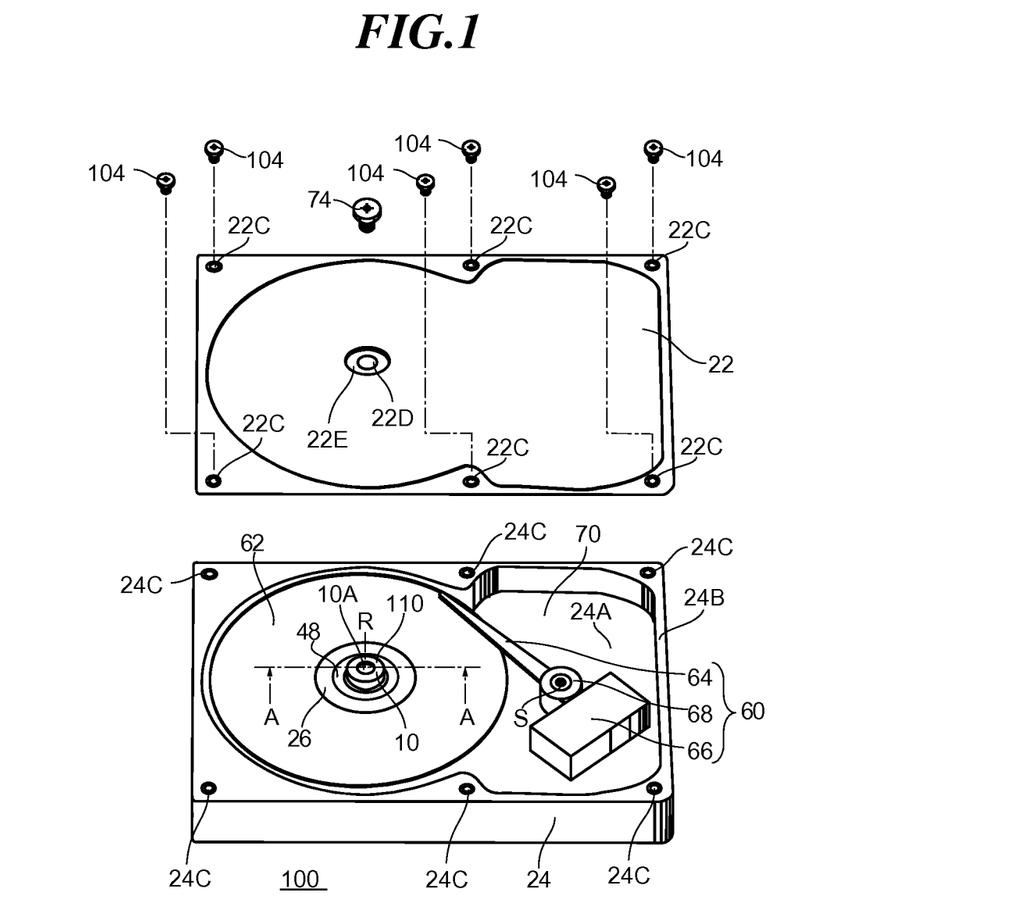
FIG. 1 is an exploded perspective view illustrating a rotating device according to an embodiment of the present invention.

FIG. 1 is a perspective view showing a rotating device 100 according to an embodiment of the present invention. FIG. 1 shows a condition in which a top cover 22 is detached to facilitate understanding for the present invention. Illustration of members not important to explain the present invention, such as a clamper and an electronic circuit, are omitted in FIG. 1. A rotating device 100 includes a chassis 24, an upper shaft member 110, a hub 26, a magnetic recording disk 62, a data reader/writer 60, the top cover 22, a center screw 74, and for example, six peripheral screws 104.

In the following explanation, a side where the hub 26 is mounted relative to the chassis 24 is defined as an upper side. Moreover, a direction along the rotational axis R of a rotating body, an arbitrary direction traversing the rotational axis R on a plane orthogonal to the rotational axis R, and an arbitrary direction on such a plane are referred to as an axial direction, a radial direction, and a planar direction, respectively, in some cases. The indications of such directions are not to limit the posture of the rotating device 100 when in use, and the rotating device 100 can be used in any posture.

The magnetic recording disk 62 is, for example, a 2.5-inch magnetic recording disk having a diameter of 65 mm and formed of a glass, and a diameter of a center hole thereof is 20 mm. If the magnetic recording disk 62 is made thin, the rigidity thereof decreases, and is warped when polished at the time of the manufacturing of the rotating device 100, thereby reducing the processing flatness. Conversely, if the magnetic recording disk 62 is made thick, the weight increases. Regarding the magnetic recording disk 62, it is proven if the thickness is within a range at least from 0.5 mm to 1.25 mm, the rigidity and the weight are practical. In this embodiment, the magnetic recording disk 62 has a thickness of from 0.7 mm to 0.9 mm, which suppresses a decrease of the processing flatness, thereby suppressing a reduction of the recording density. For example, a magnetic recording disk 62 is to be mounted on the hub 26, and is rotated together with the rotation of the hub 26. The magnetic recording disk 62 is fastened to the hub 26 by spacers 72 (unillustrated in FIG. 1) and a clamper 78 (also unillustrated in FIG. 1).

The chassis 24 has a bottom plate 24A that forms the bottom of the rotating device 100, and an outer periphery wall 24B that is formed along the outer periphery of the bottom plate 24A so as to surround the region where the magnetic recording disk 62 is mounted. For example, six screw holes 24C are formed in the upper face of the outer periphery wall 24B.

The data reader/writer 60 includes a recording/playing head (unillustrated), a swing arm 64, a voice coil motor 66, and a pivot assembly 68. The recoding/playing head is attached to the tip of the swing arm 64, records data in the magnetic recording disk 62, or reads the data therefrom. The pivot assembly 68 supports the swing arm 64 in a swingable manner to the chassis 24 around a head rotating shaft S. The voice coil motor 66 allows the swing arm 64 to swing around the head rotating shaft S to move the recording/playing head to a desired location over the top face of the magnetic recording disk 62. The voice coil motor 66 and the pivot assembly 68 are configured by a conventionally well-known technology of controlling the position of a head.

The top cover 22 is a thin plate formed in a substantially rectangular shape, and has, for example, six screw through-holes 22C provided at the periphery of the top cover 22, a cover recess 22E, and a center hole 22D provided at the center of the cover recess 22E. The cover recess 22E is substantially circularly formed around the rotational axis R. The top cover 22 is formed by, for example, pressing an aluminum plate or an iron-steel plate into a predetermined shape. A surface processing like plating may be applied on the top cover 22 in order to suppress corrosion. The top cover 22 is fixed to the upper face of the outer periphery wall 24B of the chassis 24 by, for example, the six peripheral screws 104. The six peripheral screws 104 correspond to the six screw through-holes 22C and the six screw holes 24C, respectively. In particular, the top cover 22 and the upper face of the outer periphery wall 24B are fixed with each other so as to suppress a leak into the interior of the rotating device 100 from the joined portion of the top cover 22 and the upper face of the outer periphery wall 24B. The interior of the rotating device 100 is, more specifically, a clean space 70 surrounded by the bottom plate 24A of the chassis 24, the outer periphery wall 24B of the chassis 24, and the top cover 22. This clean space 70 is designed so as to be fully sealed, i.e., so as not to have a leak-in from the exterior and a leak-out to the exterior. The clean space 70 is filled with clean air having particles eliminated. Hence, foreign materials like the particles are prevented from sticking to the magnetic recording disk 62, thereby improving the reliability of the operation of the rotating device 100. The center screw 74 corresponds to a retainer hole 10A of the upper shaft member 110. The top cover 22 is joined with an upper rod 10 to be discussed later of the upper shaft member 110 by letting the center screw 74 to pass all the way through the center hole 22D and screwing and engaging the center screw 74 into the retainer hole 10A.

Figure 2:
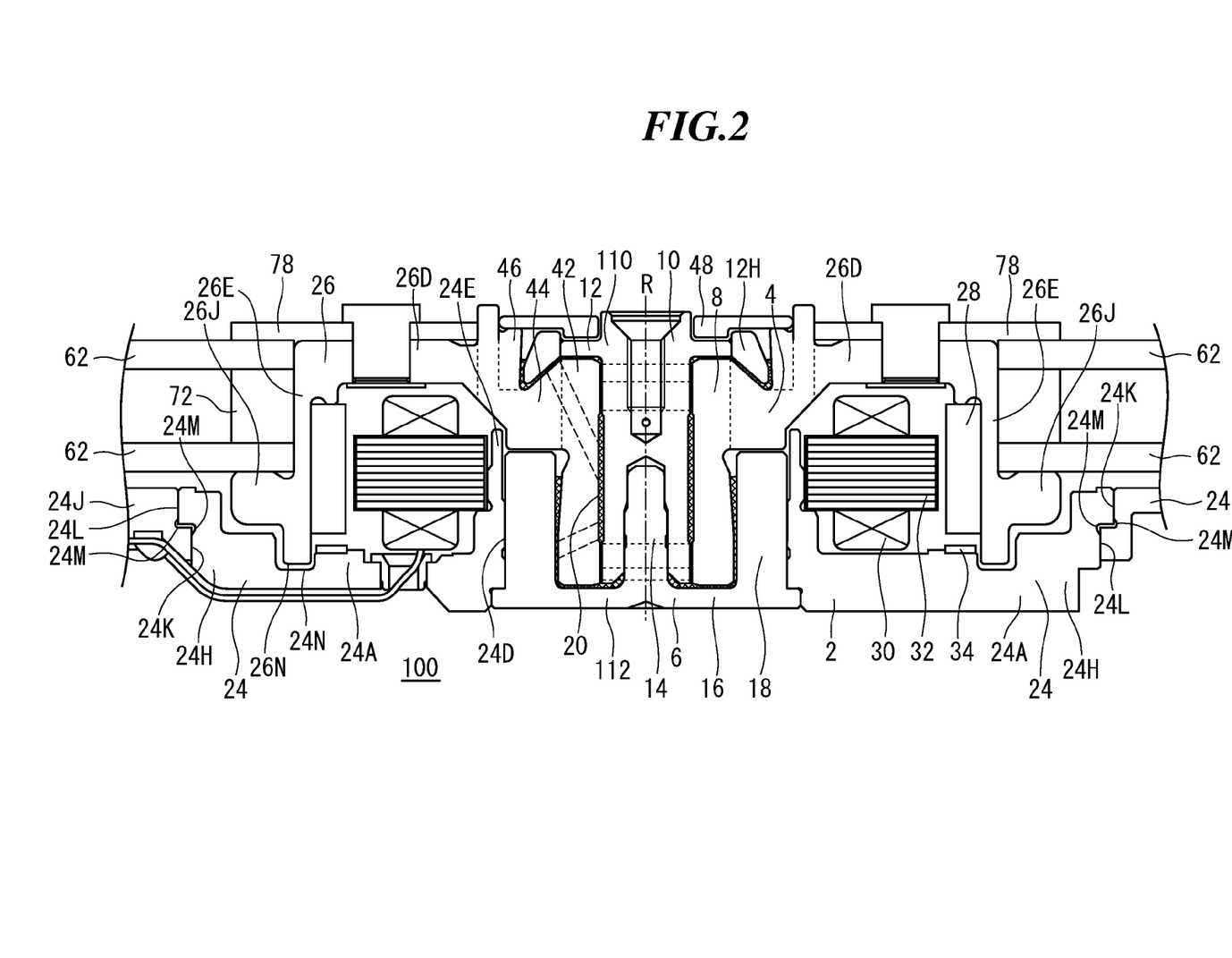
FIG. 2 is a cross-sectional view taken along a line A-A in FIG. 1.
Figure 3:
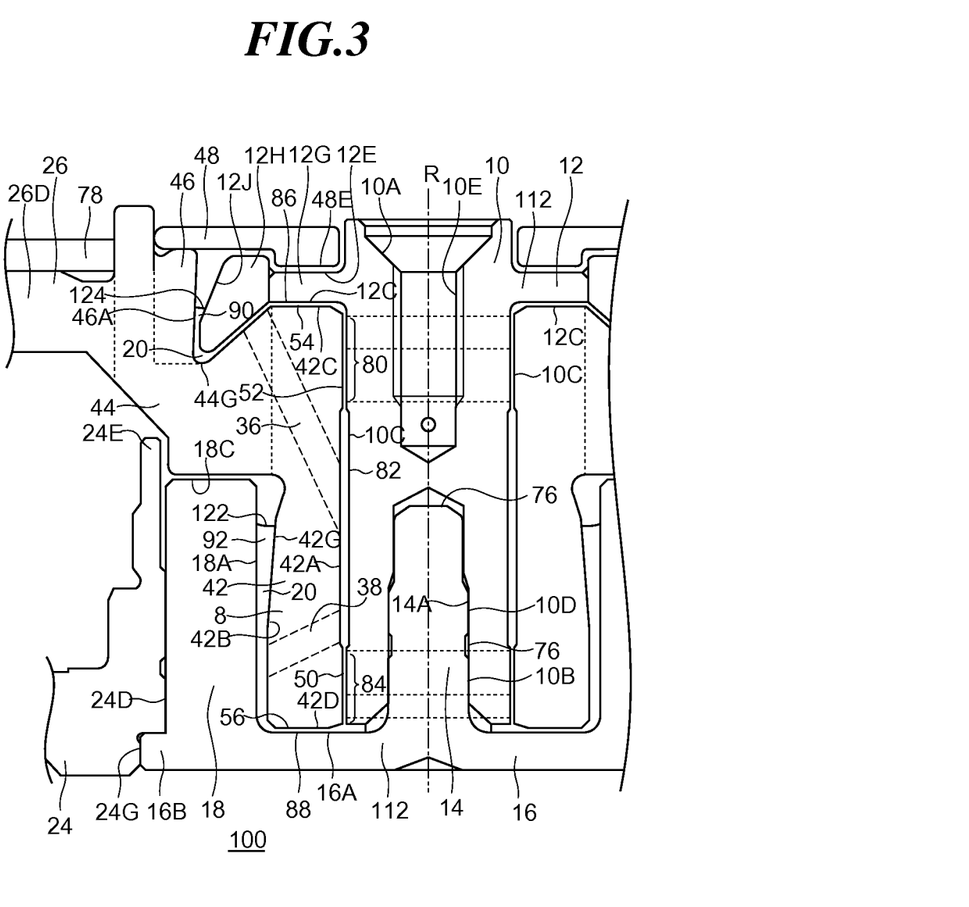
FIG. 3 is an enlarged cross-sectional view illustrating peripheries of a shaft body and a bearing unit both in FIG. 2 in an enlarged manner.

FIG. 2 is a cross-sectional view taken along a line A-A in FIG. 1. FIG. 3 is an enlarged cross-sectional view illustrating peripheries of the shaft body and the bearing unit in FIG. 2 in an enlarged manner. The notation of a reference numeral for the same member symmetrical in the right and the left along the rotational axis R in FIG. 2 will be omitted in some cases.

With reference to FIG. 2, a stationary body 2 includes a shaft body 6, a stator core 32, coils 30, and further a magnetic ring 34. The shaft body 6 includes the upper shaft member 110 and a lower shaft member 112. The upper shaft member 110 includes an upper rod 10 and an upper flange 12. The lower shaft member 112 includes a lower rod 14, a lower flange 16, and a flange encircling portion 18. The upper rod 10 and the lower rod 14 will be comprehensively and simply referred to as a shaft in some cases below.

A rotating body 4 includes a bearing unit 8, a cap 48, and further a cylindrical magnet 28. The bearing unit 8 includes a sleeve 42, a joint 44, and a ring portion 46. The rotating body 4 and the stationary body 2 have a lubricant 20 that is a lubrication medium continuously present in some spaces between the shaft body 6 and the bearing unit 8. The sleeve 42, the joint 44 and the ring portion 46 are members encircling the shaft, and may be referred to as a shaft encircling member in some cases.

Still further, the shaft body 6, the bearing unit 8, and the lubricant 20 configure a fluid bearing unit together with a dynamic pressure bearing part to be discussed later.

The material and the method for forming the chassis 24 are not limited to any particular ones. In this embodiment, as an example, the chassis 24 is formed as a single piece by die-cast molding of an aluminum alloy. The chassis 24 may be formed by, for example, pressing of a sheet metal like stainless steel or aluminum. The chassis 24 may partially have a cut face formed by cutting and machining. For example, the chassis 24 may have a surface-finish layer like nickel plating. Moreover, the chassis 24 may have a portion formed of a resin. Still further, the chassis 24 may have a coating layer of, for example, an epoxy resin. The bottom plate 24A of the chassis 24 may be formed by laminating equal to or greater than two sheets.

In this embodiment, the bottom plate 24A includes a base 24H that is a center portion, and a frame 24J that extends outwardly in the radial direction from the outer periphery of the base 24H. In other words, the base 24H is encircled by the frame 24J. The outer edge of the base 24H at a projection area in the axial direction surrounds the outer edge of the hub 26 at a projection area in the axial direction. That is, the base 24H includes, in the bottom plate 24A, all regions facing with the hub 26 in the axial direction. The base 24H includes an opening 24D around the rotational axis R of the rotating body 4 and a cylindrical projection 24E that encircles the opening 24D. The projection 24E protrudes toward the hub 26 from the upper face of the base 24H. The base 24H of the bottom plate 24A is provided with an annular recess 24N around the rotational axis R. The annular recess 24N is provided at a location facing with a mount portion 26J of the hub 26 to be discussed later in the axial direction. The outer periphery wall 24B protrudes toward the hub 26 from the frame 24J. The bottom plate 24A is formed by joining the base 24H and the frame 24J which are formed separately. The base 24H and the frame 24J may be formed of the same material.

In this embodiment, the base 24H is formed by, for example, cutting and machining a ferrous material like SUS 303, and the frame 24J is formed by, for example, die-cast molding of an aluminum alloy. SUS 303 has a Young's modulus that is higher than 100 GPa and the aluminum alloy has a Young's modulus that is smaller than 100 GPa. Hence, the base 24H is formed of a material having a larger Young's modulus than that of the aluminum alloy to form the frame 24J. Moreover, SUS 303 has a specific gravity that is larger than 6, and the aluminum alloy has a specific gravity that is smaller than 3. Hence, the frame 24J is formed of a material having a smaller specific gravity (density) than that of the material to form the base 24H.

An external tier 24K for an engagement is provided in an outer periphery surface of the base 24H, and an internal tier 24L to be engaged with the external tier 24K is provided in an inner periphery surface of the frame 24J. Tapered surfaces to be engaged with each other may be provided instead of the external tier 24K and the internal tier 24L. The base 24H is fixed to the frame 24J by, for example, bonding. Interference fitting may be further applied. A bond groove 24M which runs in the circumferential direction and to which a bond is applied is provided in at least one of the outer periphery surface of the base 24H and the inner periphery surface of the frame 24J. The bond groove 24M of the one periphery surface and the bond groove 24M of another periphery surface at least partially face with each other in the radial direction.

The stator core 32 includes an annular part, and, for example, 12 salient poles protruding from the annular part outwardly in the radial direction. The inner periphery surface of the annular part of the stator core 32 is joined with the base 24H by press-fitting, bonding or a combination thereof. The stator core 32 is formed of, for example, five magnetic steel sheets laminated together and integrated together by caulking, each having a thickness of, for example, 0.2 mm. A surface layer is formed on the surface of the stator core 32. An insulation coating like electrodeposition coating or powder coating is applied to the surface of the stator core 32, i.e., the surface layer.

The coils 30 are each formed by winding a conductor wire around each salient pole of the stator core 32 by a predetermined number of turns. When a drive current is allowed to flow the coil 30, the coil 30 produces a field magnetic field along the salient pole. The conductor wire is formed of, for example, a core like soft copper having an insulation layer like a urethane resin coating the surface of the core. A lubrication substance to reduce a friction resistance is applied to the surface of the conductor wire. The lubrication substance is not limited to any particular one, but in this embodiment, a lubrication substance mainly containing a polyamide compound is applied to the conductor wire to suppress the sticking of hydro carbons like paraffin as much as possible. Moreover, the coil 30 wound around the salient pole is soaked in pure water or a cleaning liquid containing a surfactant agent or ester, and is rinsed while being irradiated with ultrasound. Hence, hydro carbons sticking to the surface of the coil 30 are further reduced. As a result, the total amount of hydro carbon sticking to the coil 30 is less than the total amount of the polyamide compounds sticking to the coil 30.

The magnetic ring 34 is a hollow ring that is thin in the axial direction, and has the inner periphery thereof disposed coaxially with the magnet 28 along the rotational axis R. The magnetic ring 34 is firmly fixed to the upper face of the base 24H by, for example, bonding, caulking, or a combination thereof. The magnetic ring 34 is formed by, for example, pressing an iron-steel plate with soft magnetism. The magnetic ring 34 has an area facing a lower face of the magnet 28 in the axial direction in a non-contact manner, and provides downward suction force to the magnet 28. This configuration suppresses a floating of the rotating body 4 in the axial direction.

The hub 26 includes a disk portion 26D that extends outwardly in the radial direction from the center, an annular portion 26E that extends downwardly in the axial direction from the outer periphery of the disk portion 26D, the mount portion 26J that extends outwardly in the radial direction from the lower outer periphery surface of the annular portion 26E, and a projecting wall 26N that protrudes from the lower part of the mount portion 26J toward the base 24H in the axial direction. The disk portion 26D, the annular portion 26E, the mount portion 26J, and the projecting wall 26N are formed annularly and coaxially with each other around the rotational axis R. As a result, the hub 26 is formed in a substantially cup shape. The disk portion 26D, the annular portion 26E, the mount portion 26J, and the projecting wall 26N are formed together. The hub 26 is formed of a ferrous material with soft magnetism like SUS 430F. The center hole of the magnetic recording disk 62 in a disk shape is to be engaged with the annular portion 26E of the hub 26, and the magnetic recording disk 62 is to be mounted on the mount portion 26J. A part of the projecting wall 26N enters the annular recess 24N in the axial direction provided in the base 24H. The gap between the projecting wall 26N and the recess 24N forms a labyrinth.

In order to make the upper magnetic recording disk 62 and the lower magnetic recording disk 62 spaced apart from each other, the spacer 72 is provided. The spacer 72 is a hollow ring, has an inner periphery surface engaged with the annular portion 26E. The spacer 72 is held between the lower magnetic recording disk 62 and the upper magnetic recording disk 62. The clamper 78 is also provided to prevent the magnetic recording disk 62 from being disengaged with the hub 26 by pushing down the uppermost magnetic recording disk 62. The clamper 78 is a hollow disk, and is fastened to the hub 26 by fastener like a screw.

The magnet 28 is a hollow ring, and has, for example, an outer periphery surface bonded to the inner periphery surface of the hub 26. The magnet 28 has an upper face contacting the protrusion of the hub 26. The magnet 28 is formed of, for example, a ferrite-based magnetic material or a rare-earth magnetic material. The magnet 28 contains a resin like polyamide as a binder. The magnet 28 may be the layer of a ferrite-based magnet and the layer of a rare-earth magnet laminated together. A surface layer formed by, for example, electrodeposition coating or a spray painting is formed on the surface of the magnet 28. The surface layer suppresses an oxidization of the magnet 28, or suppresses a peeling of the surface of the magnet 28. For example, 16 magnetic poles are provided on the inner periphery surface of the magnet 28 in the circumferential direction, and the inner periphery surface faces with the outer periphery surfaces of the salient poles of the core 32 in the radial direction with respective gaps.

Next, an explanation will be given of a fluid bearing unit and peripheral portions thereof with reference to FIG. 3. FIG. 3 is an enlarged cross-sectional view illustrating the peripheries of the shaft body 6 and the bearing unit 8 in FIG. 2 in an enlarged manner. FIG. 3 mainly illustrates the left part of the rotational axis R.

The lower shaft member 112 includes a lower rod 14 in a rod shape protruding upwardly, a lower flange 16 in a disk shape extending outwardly in the radial direction from the lower end of the lower rod 14, and the flange encircling portion 18 in an annular shape protruding upwardly from the lower flange 16. The lower rod 14 has a male screw 14A provided on the outer periphery surface thereof. The lower shaft member 112 has, for example, the lower rod 14, the lower flange 16, and the flange encircling portion 18 formed together. In this case, it becomes possible to reduce the manufacturing error of the lower shaft member 112, and to eliminate a joining work. Alternatively, it becomes possible to suppress a deformation of the lower shaft member 112 against a shock load. The lower shaft member 112 is formed by, for example, cutting and machining of a metal like SUS 303. Depending on the application of the rotating device 100 and the restriction on the designing, etc., the lower shaft member 112 may be formed of other materials like a resin and may be formed by other techniques, such as pressing and molding.

The lower shaft member 112 has, for example, the outer periphery surface of the flange encircling portion 18 bonded to the inner periphery surface of the opening 24D, thereby being fixed to the base 24H. The flange encircling portion 18 has its upper end 18C located at or above, for example, the area where a second radial dynamic pressure groove 50 to be discussed later is provided in the axial direction.

The lower flange 16 has a collar 16B which is formed on the outer periphery of the lower flange 16 and which is larger than the opening 24D of the base 24H. The base 24H is provided with a collar retainer space 24G at the edge of the opening 24D as an annular recess. The collar retainer space 24G retains at least a part of the collar 16B. The lower shaft member 112 has the collar 16B facing with the end face of the collar retainer space 24G of the base 24H in the axial direction. A bond is present between the collar 16B and the collar retainer space 24G.

The upper shaft member 110 includes an upper rod 10 in a rod shape, and an upper flange 12 in a substantially disk shape extending outwardly in the radial direction from the upper end of the upper rod 10. The upper flange 12 includes a first projection 12G that contacts the upper rod 10, and a flanged projection 12H coupled with the external side of the first projection 12G in the radial direction. The upper flange 12 has a tapered face 12J formed in the outer periphery surface thereof and increasing a distance from the rotational axis R in the radial direction as becoming closer to the base 24H.

The upper rod 10 includes a retainer hole 10A provided in the upper end, and a rod retainer space 10B that is a hole provided in the lower end to retain the lower rod 14. The retainer hole 10A and the rod retainer space 10B are in a pouch shape, and are not in communication with each other. The retainer hole 10A and the rod retainer space 10B may be in communication with each other in the axial direction. The upper rod 10 has a female screw 10E provided in the retainer hole 10A, and also has a female screw 10D provided in the inner periphery surface of the rod retainer space 10B.

The upper shaft member 110 has the upper rod 10 and the first projection 12G of the upper flange 12 formed together. The upper rod 10 and the first projection 12G may be formed separately, and joined together later. The first projection 12G and the flanged projection 12H are formed separately, but are joined together later. The first projection 12G and the flanged projection 12H may be formed together. In this case, the dimensional precision of the upper shaft member 110 can be improved, and a joining work can be eliminated.

The upper shaft member 110 is formed by, for example, cutting and machining of a ferrous material, such as SUS 420J2, SUS 430, or SUS 303. The upper shaft member 110 may be sintered in order to enhance the hardness. The upper shaft member 110 may have an outer periphery surface 10C of the upper rod 10 and a lower face 12C of the upper flange 12 polished in order to enhance the dimensional precision. The upper shaft member 110 may be formed of other materials like a resin and may be formed by other techniques, such as pressing and molding.

The lower rod 14 is joined with the upper rod 10 by letting the male screw 14A provided on the lower rod 14 being engaged with the female screw 10D provided in the rod retainer space 10B of the upper rod 10. A sealant 76 is present in a gap between the lower rod 14 and the upper rod 10 in the radial direction. In addition, the sealant 76 may be present in, for example, a gap between the upper rod 10 and the lower rod 14 in the axial direction. Still further, the sealant 76 may be present in a gap between the female screw 10D and the male screw 14A in the radial direction. The sealant 76 suppresses a leak-out of the lubricant 20, or improves the joining strength between the lower rod 14 and the upper rod 10. An example sealant 76 applied is an anaerobic bond.

The bearing unit 8 includes the sleeve 42 in a substantially cylindrical shape that encircles the upper rod 10, the joint 44 that encircles the sleeve 42, and the ring portion 46 that is provided at an upper-end side of the joint 44 and encircles the upper flange 12. The bearing unit 8 has the sleeve 42, the joint 44, and the ring portion 46 formed together. The bearing unit 8 may have any of the sleeve 42, the joint 44, and the ring portion 46 formed separately and joined together later. The bearing unit 8 has the sleeve 42 encircling the upper rod 10 with a gap, and thus the sleeve 42 is rotatable relative to the upper rod 10. The bearing unit 8 has the sleeve 42 being present between the upper flange 12 and the lower flange 16 with gaps. The bearing unit 8 has the joint 44 encircled by the hub 26. The bearing unit 8 may be formed separately from the hub 26, and joined together later. The bearing unit 8 has the sleeve 42 encircled by the flange encircling portion 18 with a gap. Such a structure allows the hub 26 to be supported in a freely rotatable manner relative to the base 24H.

The bearing unit 8 and the hub 26 are each formed by, for example, cutting and machining a metal like SUS 430. The bearing unit 8 and the hub 26 may each have a surface layer formed by, for example, electroless nickel plating. The bearing unit 8 may be formed of other materials like brass.

The sleeve 42 is in a substantially cylindrical shape with a hollow, and includes an inner periphery surface 42A, an outer periphery surface 42B, an upper face 42C, and a lower face 42D. The sleeve 42 has the inner periphery surface 42A encircling the upper rod 10 with a gap. Provided in the gap in the radial direction between the inner periphery surface 42A of the sleeve 42 and the outer periphery surface 10C of the upper rod 10 are a first radial dynamic pressure bearing part 80, an intermediate space 82, and a second radial dynamic pressure bearing part 84. The first radial dynamic pressure bearing part 80 is provided above the second radial dynamic pressure bearing part 84 in a manner distant therefrom, and the intermediate space 82 is provided between the first and second radial dynamic pressure bearing parts 80 and 84. The area of the inner periphery surface 42A of the sleeve 42 corresponding to the first radial dynamic pressure bearing part 80 is provided with a first radial dynamic pressure groove 52 that generates radial dynamic pressure. The first radial dynamic pressure groove 52 may be provided in the outer periphery surface 10C of the upper rod 10 instead of the sleeve 42. The area of the inner periphery surface 42A of the sleeve 42 corresponding to the second radial dynamic pressure bearing part 84 is provided with a second radial dynamic pressure groove 50 that generates radial dynamic pressure. The second radial dynamic pressure groove 50 may be provided in the outer periphery surface 10C of the upper rod 10 instead of the sleeve 42. The area of the inner periphery surface 42A of the sleeve 42 corresponding to the intermediate space 82 is provided with a large-diameter part that is concaved outwardly in the radial direction. In the following explanation of this embodiment, the areas where the second radial dynamic pressure groove 50 and the first radial dynamic pressure groove 52 are provided are referred to as a provided area of a radial dynamic pressure groove in some cases.

Figure 5:
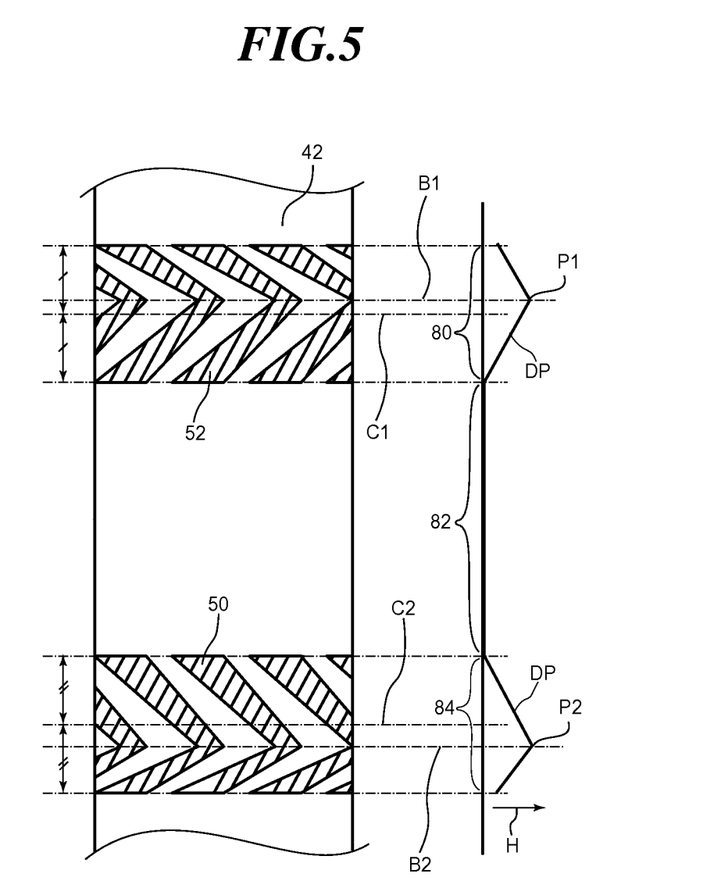
FIG. 5 is an exemplary diagram of a distribution of radial dynamic pressure in the rotating device of the embodiment.

FIG. 5 is a pressure distribution diagram exemplarily illustrating a distribution DP of radial dynamic pressure of the rotating device 100 in this embodiment. An arrow H indicates a direction in which pressure becomes high. The first radial dynamic pressure groove 52 is, for example, in a herringbone shape with bent areas. Vertices B1 of the bent areas of the first radial dynamic pressure groove 52 are located above an axial-direction center C1 of the provided area of the first radial dynamic pressure groove 52. In this case, the pressure distribution DP becomes the lowest at the lower end of the first radial dynamic pressure groove 52, but becomes high toward the vertices B1 of the bent areas, and becomes the maximum near the vertices B1 of the bent areas. Still further, the pressure distribution becomes small from the vertices B1 of the bent areas toward the upper end. That is, a maximum pressure generated location P1 of the dynamic pressure generated by the first radial dynamic pressure groove 52 in the axial direction is present near the vertices B1 of the bent areas. In other words, the maximum pressure generated location P1 of the first radial dynamic pressure groove 52 is located at the upper-flange-12 side of the axial-direction center C1. According to this structure, when the bearing unit 8 and the shaft body 6 relatively rotate with each other, the first radial dynamic pressure bearing part 80 pushes the lubricant 20 toward a first thrust opposing part 86 to be discussed later. The first radial dynamic pressure groove 52 may be formed in other shapes like a spiral shape.

The second radial dynamic pressure groove 50 is, for example, in a herringbone shape with bent areas. Vertices B2 of the bent areas of the second radial dynamic pressure groove 50 are located below an axial-direction center C2 of the provided area of the second radial dynamic pressure groove 50. A maximum pressure generated location P2 of the second radial dynamic pressure groove 50 is located at the lower-flange-16 side of the axial-direction center C2 through the similar mechanism to that of the above-explained maximum pressure generated location P1. According to such a structure, when the bearing unit 8 and the shaft body 6 relatively rotate with each other, the second radial dynamic pressure bearing part 84 pushes the lubricant 20 toward a second thrust opposing part 88 to be discussed later. The second radial dynamic pressure groove 50 may be in other shapes like a spiral shape.

The first radial dynamic pressure groove 52 has a narrower groove width at the center (vertices B1 of the bent areas) than the end of the provided area, and has a shallower groove depth at the center (vertices B1 of the bent areas) than the end of the provided area. The first radial dynamic pressure groove 52 may have at least one of the groove width and the groove depth substantially uniform.

The second radial dynamic pressure groove 50 has a narrower groove width at the center (vertices B2 of the bent areas) than the end of the provided area, and has a shallower groove depth at the center (vertices B2 of the bent areas) than the end of the provided area. The second radial dynamic pressure groove 50 may have at least one of the groove width and the groove depth substantially uniform.

Returning now to FIG. 3, the first thrust opposing part 86 is provided in the gap where the lower face 12C of the upper flange 12 and the upper face 42C of the sleeve 42 face with each other in the axial direction. A first thrust dynamic pressure groove 54 to generate thrust dynamic pressure is provided in the area of the upper face 42C of the sleeve 42 corresponding to the first thrust opposing part 86. The first thrust dynamic pressure groove 54 may be provided in the area of the lower face 12C of the upper flange 12 corresponding to the first thrust opposing part 86 instead of the sleeve 42. The second thrust opposing part 88 is provided in the gap where the upper face 16A of the lower flange 16 and the lower face 42D of the sleeve 42 face with each other in the axial direction. A second thrust dynamic pressure groove 56 to generate thrust dynamic pressure is provided in the area of the lower face 42D of the sleeve 42 corresponding to the second thrust opposing part 88. The second thrust dynamic pressure groove 56 may be provided in the area of the upper face 16A of the lower flange 16 corresponding to the second thrust opposing part 88 instead of the sleeve 42. In the following explanation of this embodiment, the area where the first thrust dynamic pressure groove 54 or the second thrust dynamic pressure groove 56 is provided is referred to as a provided area of a thrust dynamic pressure groove in some cases.

The first and second thrust dynamic pressure grooves 54 and 56 are each formed in, for example, a spiral shape. The first and second thrust dynamic pressure grooves 54 and 56 may be formed in other shapes like a herringbone shape. The second radial dynamic pressure groove 50, the first radial dynamic pressure groove 52, the first thrust dynamic pressure groove 54, and the second thrust dynamic pressure groove 56 are formed by, for example, pressing, ball rolling, electrolytic etching, or cutting. Those dynamic pressure grooves may be formed by different techniques individually.

The joint 44 is in a hollow annular shape, has an annular recess 44G provided in the upper face thereof and concaved downwardly in the axial direction, and a part of the upper flange 12 enters this annular recess 44G. More specifically, the tip of the flanged projection 12H of the upper flange 12 extends downwardly from the first projection 12G, and enters the annular recess 44G in the axial direction. The flanged projection 12H relatively rotates in the annular recess 44G in a non-contact manner. The joint 44 is provided so as to encircle an upper part of the outer periphery of the sleeve 42. The joint 44 has a lower surface facing with the upper end 18C of the flange encircling portion 18 in the axial direction with a gap, thereby forming a labyrinth. The disk portion 26D of the hub 26 extends outwardly in the radial direction from the outer periphery of the joint 44.

The outer periphery surface 42B of the sleeve 42 has a tapered face 42G that decreases a radius toward the upper end and formed in the area facing with the inner periphery surface 18A of the flange encircling portion 18 in the radial direction. The gap between the tapered face 42G and the inner periphery surface 18A in the radial direction forms a tapered space that gradually becomes widespread toward the upper space in the axial direction. The tapered face 42G and the inner periphery surface 18A contact an encircling-portion-side air-liquid interface 122 of the lubricant 20 to be discussed later, thereby forming a second capillary seal 92 that suppresses a dispersion of the lubricant 20 by capillary force. For example, the encircling-portion-side air-liquid interface 122 is located at or above the provided area of the second radial dynamic pressure groove 50 in the axial direction. For example, the encircling-portion-side air-liquid interface 122 is provided outwardly in the radial direction with respect to the first thrust opposing part 86 and the second thrust opposing part 88.

The ring portion 46 is provided at the inner periphery of the joint 44 so as to encircle the upper flange 12. The gap between an inner periphery surface 46A of the ring portion 46 and the tapered face 12J of the upper flange 12 in the radial direction forms a tapered space that gradually becomes widespread toward the upper space. The inner periphery surface 46A of the ring portion 46 and the tapered face 12J of the upper flange 12 contact a flange-side air-liquid interface 124 of the lubricant 20, thereby forming a first capillary seal 90 that suppresses a dispersion of the lubricant 20 by capillary force. The provided area of the first capillary seal 90 at least partially overlaps the provided area of the first radial dynamic pressure groove 52 in the axial direction.

The sleeve 42 is provided with a communication channel for the lubricant 20 opened to the intermediate space 82. Such a communication channel is provided separately from the gap between the sleeve 42 and the upper rod 10 in the radial direction, and reduces a pressure difference in the area where the lubricant 20 is present. More specifically, the sleeve 42 includes a first communication channel 36 for the lubricant 20 which causes the area of the first thrust opposing part 86 at the flange-side air-liquid interface 124 side to be in communication with the intermediate space 82, and a second communication channel 38 for the lubricant 20 which causes the area of the second thrust opposing part 88 at the encircling-portion-side air-liquid interface 122 side to be in communication with the intermediate space 82. The first communication channel 36 and the second communication channel 38 may be each a drilled hole. The first and second communication channels 36 and 38 reduce pressure differences at both ends of the respective communication channels.

The cap 48 is in a hollow ring shape that is thin in the axial direction, and is formed by cutting and machining a stainless-steel material like SUS 303 or SUS 430. The cap 48 may be formed of other metal materials or a resin material and may be formed by pressing or molding. The cap 48 is provided on the bearing unit 8 in a fixed manner in such a way that the inner periphery of the cap 48 encircles the shaft body 6 with a gap. More specifically, the inner periphery surface of the cap 48 faces with the outer periphery surface of the upper rod 10 in a non-contact manner, and the outer periphery of the cap 48 is bonded to and fixed to the joint 44 and the ring portion 46. The cap 48 covers the flange-side air-liquid interface 124 and a part of the upper flange 12. An annular convexity 48E that protrudes downwardly is provided on the inner periphery of the cap 48 around the rotational axis R. A part of the annular convexity 48E enters in the axial direction an annular concavity 12E provided in the upper face of the upper flange 12 around the rotational axis R. The cap 48 and the upper shaft member 110 form a labyrinth of the lubricant 20, thereby suppressing a dispersion of the lubricant 20. The cap 48 may be provided on the shaft body 6 in a fixed manner so as not to contact the bearing unit 8.

The lubricant 20 continuously present in the gap between the bearing unit 8 and the shaft body 6 from the flange-side air-liquid interface 124 to the encircling-portion-side air-liquid interface 122. More specifically, the lubricant 20 is present in areas including the gap between the tapered face 12J and the inner periphery surface 46A, the gap between the upper flange 12 and the joint 44, the gap between the upper flange 12 and the sleeve 42, the gap in the radial direction between the sleeve 42 and the upper rod 10, the gap between the sleeve 42 and the lower flange 16, the gap between the tapered face 42G and the inner periphery surface 18A, the first communication channel 36, and the second communication channel 38. In other words, the lubricant 20 is continuously filled in areas including the first thrust opposing part 86, the first radial dynamic pressure bearing part 80, the intermediate space 82, the second radial dynamic pressure bearing part 84, and the second thrust opposing part 88.

When the bearing unit 8 rotates relative to the shaft body 6, the second radial dynamic pressure groove 50, the first radial dynamic pressure groove 52, the first thrust dynamic pressure groove 54, and the second thrust dynamic pressure groove 56 respectively generate dynamic pressures to the lubricant 20. The rotating body 4 coupled with the bearing unit 8 is thus supported in the radial direction and in the axial direction in a non-contact manner relative to the stationary body 2 coupled with the shaft body 6.

Figure 4:
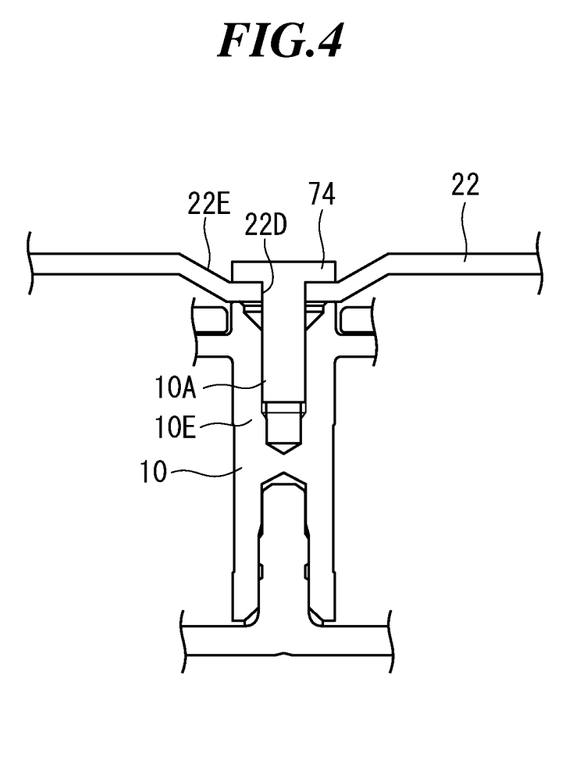
FIG. 4 is a cross-sectional view illustrating a condition in which a top cover is attached to the shaft body.

FIG. 4 is a cross-sectional view illustrating a condition in which the top cover 22 is attached to the shaft body 6. Illustration of members not important to facilitate understanding of the present invention will be omitted. The top cover 22 is joined with the upper rod 10 of the shaft body 6 by a fastener that is engaged in the retaining hole 10A. More specifically, a center screw 74 passes all the way through the center hole 22D of the top cover 22, and is engaged with a part of the female screw 10E provided in the retaining hole 10A of the upper rod 10. The top cover 22 has the peripheral edge of the center hole 22D of the cover recess 22E held between the head of the center screw 74 and the upper end face of the upper rod 10, thereby being fastened to the upper rod 10. According to a structure in which both ends of the shaft body 6 are fixed by the chassis 24 and the top cover 22, the shock resistance characteristic, etc., of the rotating device 100 can be improved.

Next, an explanation will be given of an operation of the rotating device 100 structured as explained above. In order to rotate the magnetic recording disk 62, a drive current of three phases is supplied to the coils 30. When the drive current flows through the respective coils 30, field magnetic fluxes are produced along the salient poles of the stator core 32. A mutual effect of such field magnetic fluxes and the magnetic fluxes of the drive magnetic poles of the magnet 28 applies torque to the magnet 28, and thus the hub 26 and the magnetic recording disk 62 engaged therewith start rotating. While at the same time, the voice coil motor 66 swings the swing arm 64, and thus the recording/playing head comes and goes within the swinging range over the magnetic recording disk 62. The recording/playing head converts magnetic data recorded in the magnetic recording disk 62 into electric signals, and transmits the electric signals to a control board (unillustrated), and writes data transmitted from the control board in the form of electric signals on the magnetic recording disk 62 as magnetic data.

The rotating device 100 of this embodiment employing the above-explained structure has the following features.

When the bearing unit 8 and the shaft body 6 rotate relative to each other, negative pressure to the lubricant between the first radial dynamic pressure bearing part and the second radial dynamic pressure bearing part is generated in some cases. When the negative pressure to the lubricant is generated, airs dissolved in the lubricant are vaporized and bubbles are formed. When such bubbles enter the radial dynamic pressure bearing part, the dynamic pressure generating function is disturbed, resulting in a possible reduction of the reliability of the rotating device. According to the rotating device 100, however, as explained above, the communication channels are provided which are in communication with the intermediate space 82, which suppresses a generation of negative pressure to the lubricant between the first radial dynamic pressure bearing part 80 and the second radial dynamic pressure bearing part 84.

According to the rotating device 100, when the bearing unit 8 and the shaft body 6 rotate relative to each other, the first radial dynamic pressure bearing part 80 pushes the lubricant 20 to the first thrust opposing part 86, and thus it becomes possible for the rotating device 100 to suppress a reduction of dynamic pressure near the boundary between the first thrust opposing part 86 and the first radial dynamic pressure bearing part 80. Moreover, the second radial dynamic pressure bearing part 84 pushes the lubricant 20 to the second thrust opposing part 88, and thus it becomes possible for the rotating device 100 to suppress a reduction of dynamic pressure near the boundary between the second thrust opposing part 88 and the second radial dynamic pressure bearing part 84. As a result, it becomes possible for the rotating device 100 to reduce the possibility that the rotating body 4 contacts the stationary body 2.

According to the rotating device 100, the maximum pressure generated location P1 of dynamic pressure generated by the first radial dynamic pressure groove 52 in the axial direction is located at the upper-flange-12 side of the axial-direction center C1 of the provided area of the first radial dynamic pressure groove 52. Hence, an effective bearing span can be elongated upwardly. In addition, the maximum pressure generated location P2 of dynamic pressure generated by the second radial dynamic pressure groove 50 in the axial direction is located at the lower-flange-16 side of the axial-direction center C2 of the provided area of the second radial dynamic pressure groove 50. Hence, an effective bearing span can be elongated downwardly.

According to the rotating device 100, in the first radial dynamic pressure groove 52, the vertices B1 of the bent areas are located at the upper-flange-12 side of the axial-direction center C1 of the provided area. Hence, an effective bearing span can be elongated upwardly. In addition, in the second radial dynamic pressure groove 50, the vertices B2 of the bent areas are located at the lower-flange-16 side of the axial-direction center C2 of the provided area. Hence, an effective bearing span can be elongated downwardly.

According to the rotating device 100, the bearing unit 8 has the annular recess 44G concaved in the axial direction and provided in the end face near the upper flange 12, and has the flanged projection 12H where at least a part of the upper flange 12 enters the annular recess 44G. Accordingly, the provided area of the first radial dynamic pressure bearing part 80 overlaps the provided area of the first capillary seal 90 in the axial direction. This enables an elongation of the bearing span of the radial bearing.

According to the rotating device 100, the upper flange 12 has a part formed together with the upper rod 10. Hence, a possibility that the upper flange 12 is detached from the upper rod 10 is reduced, and a boundary between the upper flange 12 and the upper rod 10 can be made thin. In addition, the lower flange 16 has a part formed together with the lower rod 14. Hence, a reduction of the joining strength between the lower flange 16 and the lower rod 14 can be suppressed, and the boundary between the lower flange 16 and the lower rod 14 can be made thin.

According to the rotating device 100, the male screw 14A of the lower rod 14 is screwed in and fastened with the female screw 10D of the upper rod 10, thereby suppressing a reduction of the joining strength between the lower rod 14 and the upper rod 10.

According to the rotating device 100, the lower flange 16 has the collar 16B formed on the outer periphery and formed with a larger diameter than the opening 24D, and this collar 16B serves as a retainer. Hence, when shock is applied to the rotating device 100, a possibility that the lower shaft member 112 is detached from the base 24H can be reduced. Moreover, the collar retainer space 24G is provided in the edge of the opening 24D. Hence, a projection of the collar 16B downwardly in the axial direction can be suppressed.

According to the rotating device 100, the base 24H of the bottom plate 24A is formed of a material with a larger Young's modulus than that of the frame 24J, and thus the base 24H can be made thin while ensuring a desired rigidity. In addition, the frame 24J is formed of a material with a smaller specific gravity (density) than that of the base 24H. Hence, an increase in weight can be suppressed.

According to the rotating device 100, the flange encircling portion 18 has its upper end 18C located at or above the provided area of the second radial dynamic pressure groove 50 in the axial direction. Hence, the volume of the gap between the inner periphery surface 18A of the flange encircling portion 18 and the outer periphery surface of the bearing unit 8 can be increased. In addition, the encircling-portion-side air-liquid interface 122 is located at or above the provided area of the second radial dynamic pressure groove 50 in the axial direction. Hence, a larger amount of lubricant 20 can be retained, thereby reducing a possibility that a failure due to the lack of the lubricant 20 occurs.

According to the rotating device 100, a part of the projecting wall 26N of the hub 26 enters the annular recess 24N of the base 24H, which increases a channel resistance. Hence, a dispersion of the lubricant 20 that has been dispersed from the encircling-portion-side air-liquid interface 122 to the area where the magnetic recording disks 62 are disposed can be suppressed.

When currents flow through the coils, and a temperature rises due to the Joule heat, paraffin components like hydro carbon sticking to the surfaces of the coils are volatilized and dispersed in surrounding areas, and eventually, reach the surfaces of the magnetic recording disks. The volatilized components build up condensation and are gradually deposited on the surfaces of the magnetic recording disks, disturbing the operation of a disk drive device. In the worst case, this causes the breakdown of the disk drive device. According to the rotating device 100, however, the total amount of hydro carbon sticking to the coils 30 is less than the total amount of polyamide compounds sticking to the coils 30. Hence, a possibility that a failure due to the volatilization of hydro carbon occurs can be reduced.

First Modified Example

Figure 6:
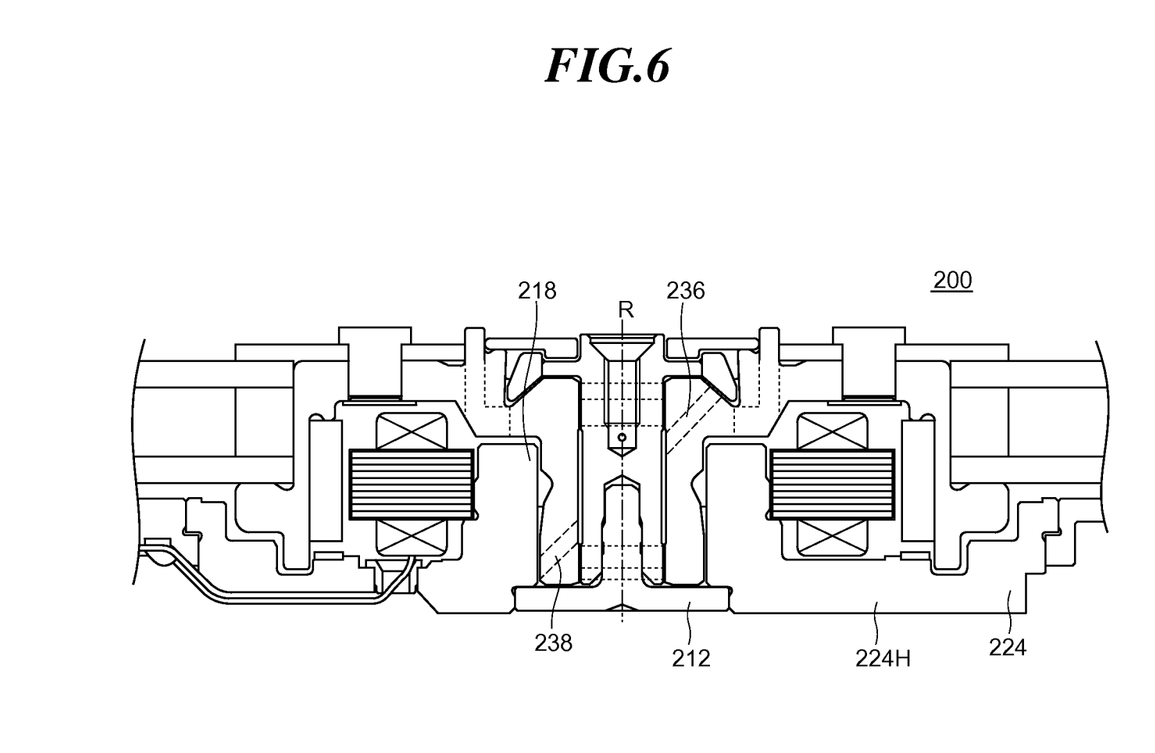
FIG. 6 is a cross-sectional view corresponding to FIG. 2 and illustrating a rotating device according to a first modified example.

Next, an explanation will be given of a modified example of the above-explained embodiment. FIG. 6 is a cross-sectional view illustrating a rotating device 200 according to a first modified example of the above-explained embodiment and corresponding to FIG. 2. Depending on the specification of the product, it is necessary to reduce, in the manufacturing process, a necessary time for machining of a component and to reduce the number of manufacturing processes. Hence, according to this rotating device 200, a flange encircling portion 218 is formed together with a base 224H. In this case, the formation of a lower shaft member 212 can be made easy, and thus a machining time can be reduced. In addition, a first communication channel 236 is formed coaxially with a second communication channel 238. In this case, the first communication channel 236 and the second communication channel 238 can be successively machined by the same drill, and thus the machining time can be reduced. The other components of the rotating device 200 employ the same structure as that of the rotating device 100. Hence, the rotating device 200 can accomplish the same advantages as those of the rotating device 100.

Second Modified Example

Figure 7:
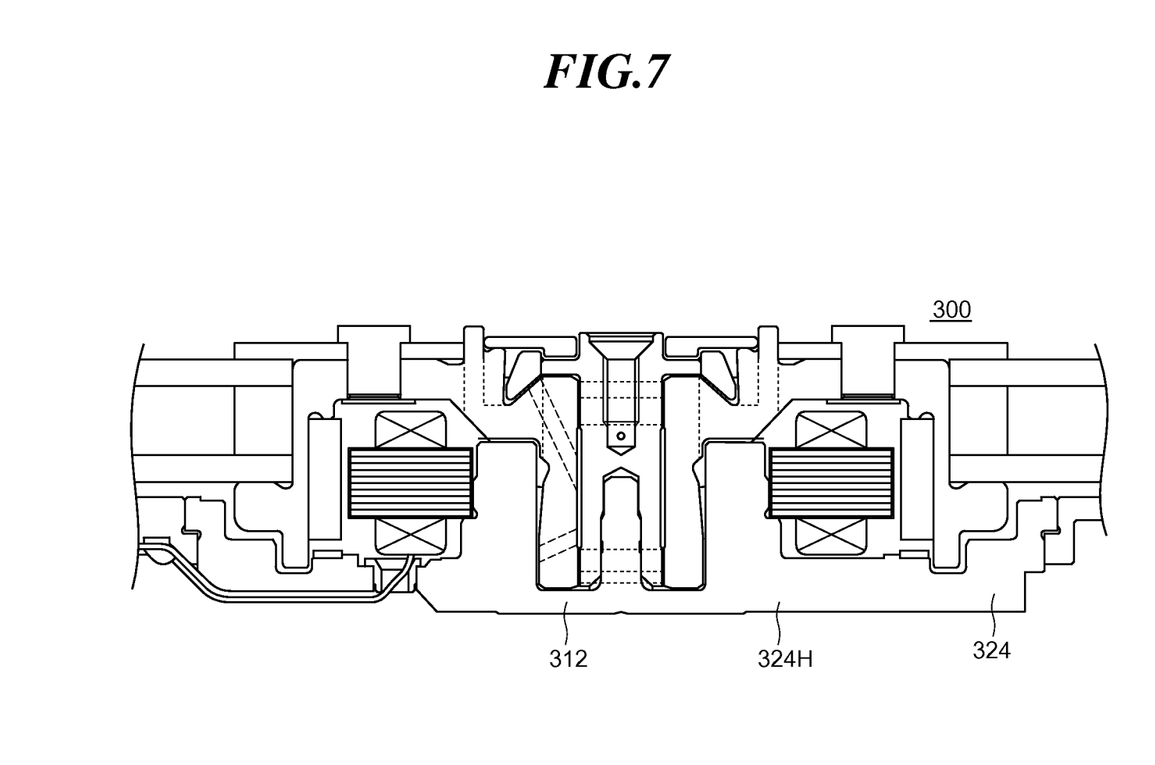
FIG. 7 is a cross-sectional view corresponding to FIG. 2 and illustrating a rotating device according to a second modified example.

FIG. 7 is a cross-sectional view illustrating a rotating device 300 according to a second modified example of the above-explained embodiment and corresponding to FIG. 2. According to a rotating device 300, a lower shaft member 312 is formed together with a base 324H. In this case, a joining work of the lower shaft member 312 with the base 324H can be eliminated. The other components of the rotating device 300 employ the same structure as that of the rotating device 100. Hence, the rotating device 300 can accomplish the same advantages as those of the rotating device 100.

The structures and operations of the rotating device according to an embodiment and the rotating device according to the modified examples thereof were explained above, but those are merely examples. It should be understood by those skilled in the art that various combinations of the structural components are possible and such structures are also within the scope and spirit of the present invention.

In the above-explained embodiment and the modified examples thereof, the explanation was given of a case in which the rotating body 4 is coupled with the bearing unit 8, and the shaft body 6 is coupled with the stationary body 2, but the present invention is not limited to this case. The rotating body 4 may be coupled with the shaft body 6, and the bearing unit 8 may be coupled with the stationary body 2.

In the above-explained embodiment and the modified examples thereof, the explanation was given of a case in which the shaft has the upper rod 10 and the lower rod 14 formed separately but joined together later, but the present invention is not limited to this case. For example, the upper rod 10, the lower rod 14, the lower flange 16, and the flange encircling portion 18 may be formed together. This suppresses a manufacturing error of the lower flange 16 and the flange encircling portion 18 with respect to the upper rod 10. After the bearing unit 8 is engaged with the shaft in this condition, the upper flange 12 can be joined with the shaft.

In the above-explained embodiment and the modified examples thereof, the explanation was given of a case in which the stator core is encircled by the magnet, but the present invention is not limited to this case. For example, the magnet may be encircled by the stator core.

In the above-explained embodiment and the modified examples thereof, the explanation was given of a case in which the first thrust dynamic pressure groove 54 is provided in the area of the upper face 42C of the sleeve 42 corresponding to the first thrust opposing part 86, but the present invention is not limited to this case. For example, it is fine if no thrust dynamic pressure groove is provided in both of the upper face 42C and the lower face 12C of the upper flange 12 in the first thrust opposing part 86.

What is claimed is:

1. A rotating device comprising:
   a shaft body comprising a shaft, a first flange extending outwardly in a radial direction from an outer periphery surface of the shaft at a first end side, and a second flange extending outwardly in the radial direction from a second end of the shaft;
   a bearing unit comprising a shaft encircling member that encircles at least a part of the shaft, the bearing unit being rotatable relative to the shaft body;
   a first thrust opposing part formed in a gap between the shaft encircling member and the first flange in an axial direction;
   an intermediate space provided in a gap between the shaft and the shaft encircling member in the radial direction;
   a radial dynamic pressure bearing part comprising a first radial dynamic pressure bearing provided at a first-thrust-opposing-part side of the intermediate space, the radial dynamic pressure bearing part generating dynamic pressure to a lubricant present between the shaft body and the bearing body;
   a first communication channel that allows the first thrust opposing part to be in communication with the intermediate space; and
   a base provided with a base opening that retains at least a part of the shaft body and fixes the shaft body;
   wherein:
   the shaft comprises an upper rod including the first flange, and a lower rod including the second flange;
   the upper rod has a fastener retainer hole formed in an end portion of the upper rod at a first-flange side;
   the fastener retainer hole is formed so as to hold a fastener that fastens a top cover;
   at least a part of the lower rod is inserted in and fixed to the base opening to fix the lower rod to the base;
   the fastener retainer hole extends in the axial direction over a region where the first radial dynamic pressure bearing is formed;
   the upper rod has a lower rod retainer hole formed in an opposite end portion to the end portion where the fastener retainer hole is formed;
   a part of the lower rod is inserted in the lower rod retainer hole to fasten the upper rod with the lower rod; and
   the fastener retainer hole is not in communication with the lower rod retainer hole in the axial direction.

2. The rotating device according to claim 1, wherein:
   a female screw is formed in an inner periphery surface of the lower rod retainer hole; and
   a male screw is formed in at least a part of an outer periphery surface of the lower rod.

3. The rotating device according to claim 1, further comprising:
   a second thrust opposing part formed in a gap between the shaft encircling member and the second flange in the axial direction; and
   a second communication channel that allows the second thrust opposing part to be in communication with the intermediate space.

4. The rotating device according to claim 1, wherein:
   the first flange comprises a flanged projection protruding outwardly in the radial direction from an outer periphery surface of the first flange;
   the bearing unit comprises an annular recess that is concaved in the axial direction and allows at least a part of the flanged projection to enter therein;
   a gap in the radial direction between the flanged projection and the annular recess forms a capillary seal of the lubricant; and
   an area where the capillary seal is provided at least partially overlaps an area where the first radial dynamic pressure bearing is provided.

* * * * *